US012810544B2

(12) United States Patent
Zhang et al.

(10) Patent No.: US 12,810,544 B2
(45) Date of Patent: Nov. 24, 2026

(54) OBJECT IDENTIFICATION

(71) Applicant: Ford Global Technologies, LLC, Dearborn, MI (US)

(72) Inventors: Xianling Zhang, San Mateo, CA (US); Alexandra Carlson, Palo Alto, CA (US); Nikita Jaipuria, Pittsburgh, PA (US); Gaurav Pandey, Katy, TX (US); Vidya Nariyambut murali, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 18/761,457

(22) Filed: Jul. 2, 2024

(65) Prior Publication Data

US 2026/0011076 A1 Jan. 8, 2026

(51) Int. Cl.
*G06T 17/00* (2006.01)
*G06T 7/20* (2017.01)
(Continued)

(52) U.S. Cl.
CPC ................ *G06T 17/00* (2013.01); *G06T 7/20* (2013.01); *G06V 20/70* (2022.01); *G06T 2207/30241* (2013.01); *G06V 2201/07* (2022.01)

(58) Field of Classification Search
CPC ......... G06T 17/00; G06T 17/205; G06T 7/20; G06T 7/521; G06T 7/70–75; G06T 2207/30241; G06T 2207/20084; G06T 2207/10028; G06T 2207/10004; G06T 3/40; G06T 9/001; G06T 7/10; G06T 2200/04; G06V 20/70; G06V 20/64; G06V 20/10; G06V 20/647; G06V 2201/07; G06V 10/25–26; G06V 10/44; G06V 10/7715; G06V 10/806; G06V 10/143;
(Continued)

(56) References Cited

U.S. PATENT DOCUMENTS

| | | | |
|---|---|---|---|
| 9,996,771 | B2 | 6/2018 | Clayton et al. |
| 10,678,244 | B2 | 6/2020 | Iandola et al. |

(Continued)

FOREIGN PATENT DOCUMENTS

| | | | |
|---|---|---|---|
| CN | 109029363 | A | 12/2018 |
| WO | 2020077117 | A1 | 4/2020 |

OTHER PUBLICATIONS

Benjin Zhu et al. "Class-balanced Grouping and Sampling for Point Cloud 3D Object Detection", Aug. 26, 2019, Institute of Automation, Chinese Academy os Sciences, Tsinghua University, pp. 1-8. (Year: 2019).*

(Continued)

*Primary Examiner* — Wesner Sajous
(74) *Attorney, Agent, or Firm* — Frank A. MacKenzie; Brooks Kushman P.C.

(57) ABSTRACT

Upon obtaining a time series of point clouds, point cloud data associated with an object is inserted in the respective point clouds. In the respective point clouds, the point cloud data is translated such that respective ranges in the point cloud data are increased based on a range threshold. Based on inputting the translated point cloud data to a machine learning program, the object is identified at or beyond the range threshold via output from the machine learning program.

20 Claims, 5 Drawing Sheets

(51) Int. Cl.
*G06V 20/10* (2022.01)
*G06V 20/70* (2022.01)

(58) Field of Classification Search
CPC .......... G06V 10/766; G06K 9/00; G06K 9/62; G01S 17/93; G06N 3/08
See application file for complete search history.

(56) References Cited

U.S. PATENT DOCUMENTS

| | | | | |
|---|---|---|---|---|
| 11,544,167 | B2 | 1/2023 | Manivasagam et al. | |
| 12,046,055 | B2 * | 7/2024 | Yoshimi | G06V 20/647 |
| 2021/0209808 | A1 * | 7/2021 | Engelland-Gay | G06T 17/205 |
| 2022/0319054 | A1 * | 10/2022 | Abdo | G06N 3/0464 |
| 2023/0206387 | A1 * | 6/2023 | Mai | G06T 3/16 382/103 |
| 2024/0394927 | A1 * | 11/2024 | Engelland-Gay | G06T 3/40 |

OTHER PUBLICATIONS

Zhang et al., "Exploring Data Augmentation for Multi-Modality 3D Object Detection", arXiv:2012.12741v2 [cs.CV] Apr. 21, 2021.
Zhu et al., "Class-balanced Grouping and Sampling for Point Cloud 3D Object Detection", arXiv:1908.09492v1 [cs.CV] Aug. 26, 2019.

* cited by examiner

OBJECT IDENTIFICATION

BACKGROUND

A deep neural network (DNN) can be trained to perform a variety of computing tasks. For example, neural networks can be trained to extract data from images. Data extracted from images by deep neural networks can be used by computing devices to operate systems including vehicles, robots, security, product manufacturing and product tracking. Images can be acquired by sensors included in a system and processed using deep neural networks to determine data regarding objects in an environment around a system. Operation of a system can rely upon acquiring accurate and timely data regarding objects in a system's environment.

DETAILED DESCRIPTION

Figure 1:
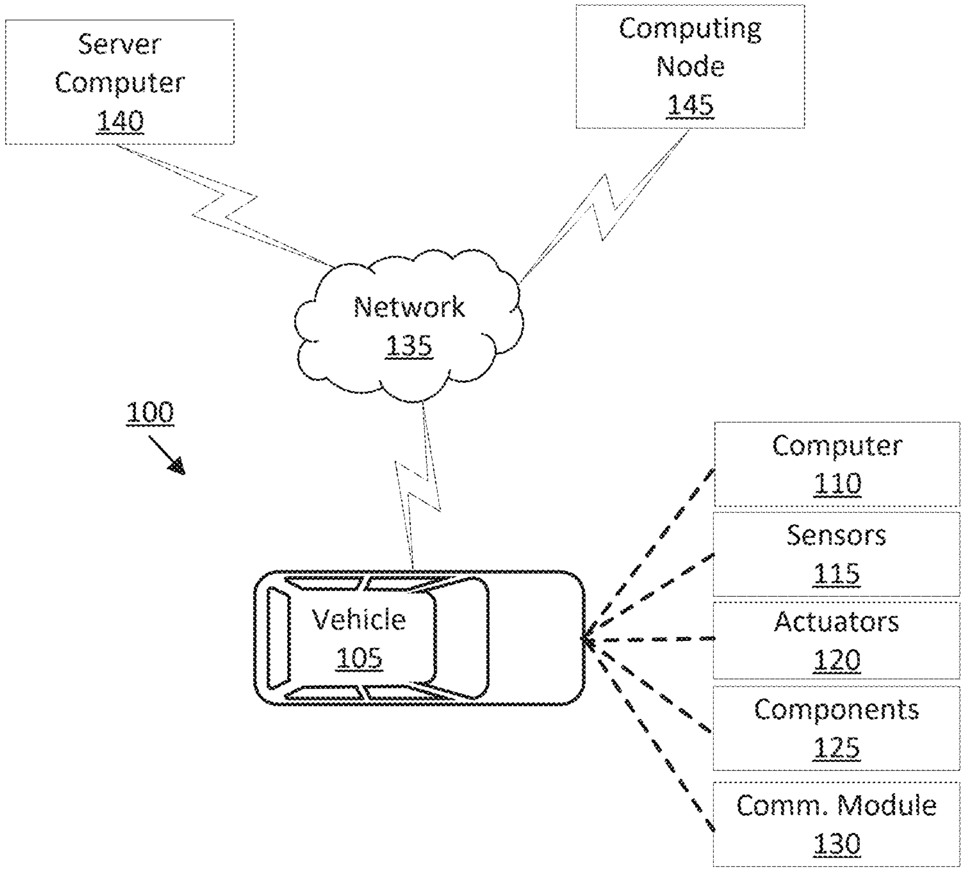
FIG. 1 is a block diagram illustrating an example vehicle control system.

A computer can utilize an object identification system to identify objects in data acquired by sensors in systems including vehicle guidance, robot operation, security, manufacturing, product tracking, etc. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, an object detection system can determine the location and orientation of one or more parts in an environment that includes a plurality of parts. In a product tracking system, an object detection system can determine a location and orientation of one or more packages in an environment that includes a plurality of packages.

Vehicle guidance will be described herein as a non-limiting example of using an object identification system to determine a path upon which to operate a vehicle through an environment while accounting for objects in the environment. For example, the object identification system can be programmed to acquire data to identify objects on a roadway. An object identification system can acquire data from a variety of sensors to identify objects, including vehicles. For example, an object detection system can acquire point cloud data from lidar sensors. The point cloud data can be processed to determine types and locations of objects. For example, the point cloud data can be passed to a deep neural network (DNN) trained to receive the point cloud data as input and to output an identification of an object and a location of an object.

Typically, a large number of annotated visual or range images can be required to train a DNN to identify objects for vehicle guidance. Annotated visual or range images include data regarding an identity and location of objects included in the visual or range images. Annotating visual or range images can require many hours of user input and many hours of computer time. For example, some training datasets include millions of images and can require millions of hours of user input and computer time. Annotations for objects in visual or range images located beyond a resolution threshold may be lacking (e.g., due to a lack of visual or range images including objects location beyond the range threshold and/or due to data resolution of objects detected beyond the detection threshold being such that the object is unable to be identified). The resolution threshold is a distance from an object to a vehicle within which the object can be identified given lidar data resolution (e.g., without overlaying image data onto the lidar data).

Techniques discussed herein enhance training of DNNs to identify objects by generating a time series of synthetic point clouds in which objects are inserted into a time series of point clouds and translated to or beyond a range threshold. The time series of synthetic point clouds are used to provide ground truth data for training the DNN. The time series of synthetic point clouds provides ground truth data to train the DNN without requiring manual annotation of the objects inserted to the time series of synthetic point clouds and translated to or beyond the range threshold, thereby reducing the time and computer resources required to produce a training dataset for training a DNN. Ground truth data can be used to determine the correctness of a result output from a DNN acquired from a source independent from the DNN. Annotating point cloud data in this fashion can provide a large number (greater than thousands) of annotated point clouds for training a DNN without requiring manual annotation, thereby saving computer resources and time.

Further, techniques discussed herein enhance upon lidar techniques by identifying, via point cloud data, objects located at or beyond the range threshold from the vehicle, which can increase an amount of time during which objects can be monitored and accounted for during vehicle guidance.

A method includes, upon obtaining a time series of point clouds, inserting point cloud data associated with an object in the respective point clouds. The method further includes translating, in the respective point clouds, the point cloud data such that respective ranges in the point cloud data are increased based on a range threshold. The method further includes, based on the translated point cloud data, training a machine learning program to identify the object at or beyond the range threshold.

The method can further include, for the respective point clouds, identifying a second object at the range threshold based on point cloud data associated with the second object. The method can further include, upon translating the point cloud data associated with the object, adjusting a density of the point cloud data associated with the object based on a density of the point cloud data associated with the second object.

The method can further include, upon obtaining point cloud data via a sensor, inputting the point cloud data into the trained machine learning program. The method can further include operating a vehicle based on output from the trained machine learning program.

The method can further include determining a trajectory of the object based on concatenating a three-dimensional (3D) bounding box associated with the translated point cloud data in the respective point clouds together.

The method can further include, upon determining that the trajectory of the object intersects a trajectory of a second object included in one of the point clouds, removing the point cloud data associated with the object from the one point cloud.

The method can further include removing the point cloud data associated with the object from each of the respective point clouds that are after the one point cloud in the time series.

The method can further include, based on inputting the trajectory to the machine learning program, training the machine learning program to predict the trajectory of the object.

The point cloud data associated with the object can be ground truth data.

The method can further include, upon translating the point cloud data, updating annotations corresponding to the point cloud data based on the increased respective ranges.

The method can further include determining a number of times to insert the point cloud data associated with the object based on a distribution of the object in a training dataset.

A system includes a computer including a processor and a memory, the memory storing instructions executable by the processor to, upon obtaining a time series of point clouds, insert point cloud data associated with an object in the respective point clouds. The instructions further include instructions to translate, in the respective point clouds, the point cloud data such that respective ranges in the point cloud data are increased based on a range threshold. The instructions further include instructions to, based on inputting the translated point cloud data to a machine learning program, identify the object at or beyond the range threshold via output from the machine learning program.

The instructions can further include instructions to, for the respective point clouds, identify a second object at the range threshold based on point cloud data associated with the second object. The instructions can further include instructions to, upon translating the point cloud data associated with the object, adjust a density of the point cloud data associated with the object based on a density of the point cloud data associated with the second object.

The system can further include a vehicle computer, including a second processor and a second memory storing instructions executable by the second processor such that the vehicle computer is programmed to upon obtaining point cloud data via a sensor, input the point cloud data into the trained machine learning program. The vehicle computer can be further programmed to operate a vehicle based on output from the trained machine learning program.

The instructions can further include instructions to determine a trajectory of the object based on concatenating a three-dimensional (3D) bounding box associated with the translated point cloud data in the respective point clouds together.

The instructions can further include instructions to, upon determining that the trajectory of the object intersects a trajectory of a second object included in one of the point clouds, remove the point cloud data associated with the object from the one point cloud.

The instructions can further include instructions to remove the point cloud data associated with the object from each of the respective point clouds that are after the one point cloud in the time series.

The instructions can further include instructions to, based on inputting the translated point cloud data to the machine learning program, predict the trajectory of the object via output from the machine learning program.

The point cloud data associated with the object can be ground truth data.

The instructions can further include instructions to, upon translating the point cloud data, updating annotations corresponding to the point cloud data based on the increased respective ranges.

The instructions can further include instructions to determine a number of times to insert the point cloud data associated with the object based on a distribution of the object in a training dataset.

Further disclosed herein is a computing device programmed to execute any of the above method steps. Yet further disclosed herein is a computer program product, including a computer readable medium storing instructions executable by a computer processor, to execute an of the above method steps.

Figure 2:
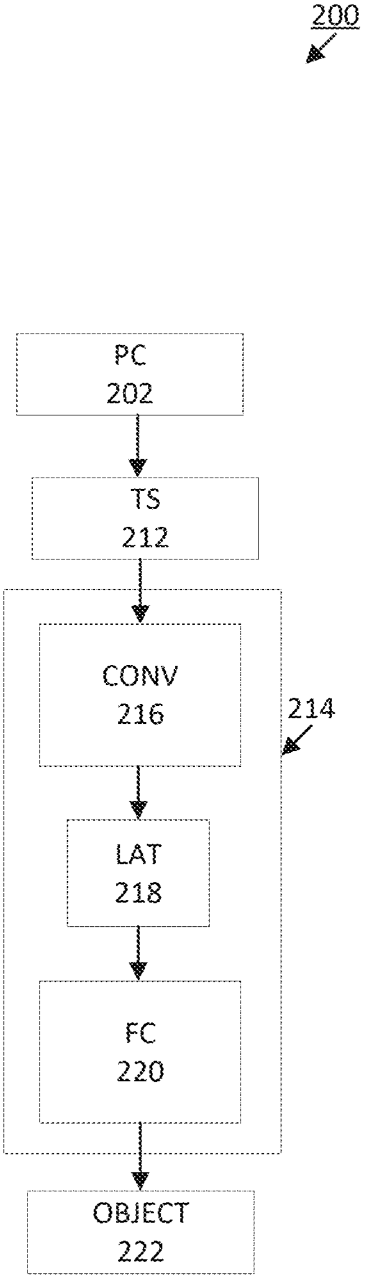
FIG. 2 is a block diagram of an example object identification system.
Figure 3:
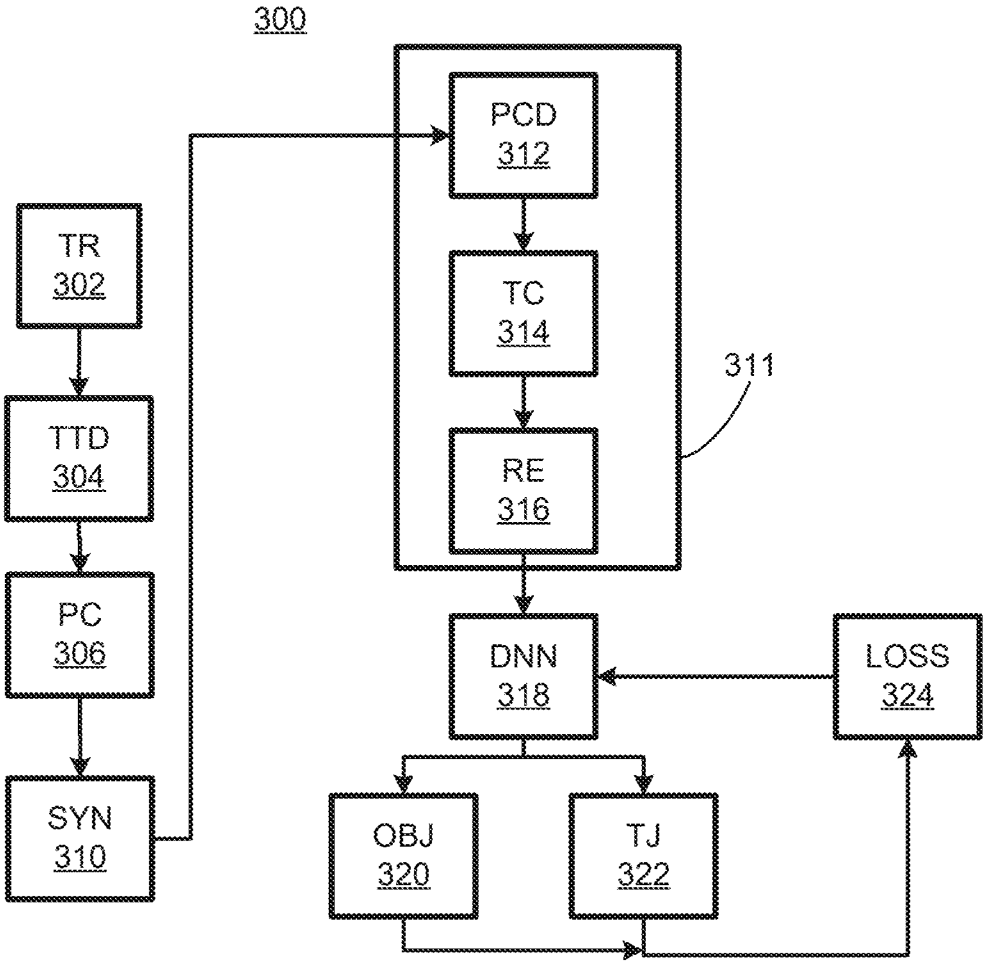
FIG. 3 is a block diagram of an example DNN training system.

With reference to FIGS. 1-3, an example vehicle control system 100 includes a vehicle 105 and a remote computing node 145. A vehicle computer 110 in the vehicle 105 receives data from sensors 115. The vehicle computer 110 is programmed to operate the vehicle 105 based on identifying respective objects and predicting respective object trajectories via a machine learning program trained by the remote computing node 145, as discussed below.

To train the machine learning program to identify respective objects, the remote computing node 145 is programmed to, upon obtaining a time series of point clouds, insert point cloud data associated with an object in the respective point clouds. The remote computing node 145 is further programmed to translate, in the respective point clouds, the point cloud data such that respective ranges in the point cloud data are increased based on a range threshold. The remote computing node is further programmed to, based on inputting the translated point cloud data to a machine learning program, identify the object at or beyond the range threshold via output from the machine learning program.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, the remote computing node 145, and/or other vehicles (e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135).

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation (e.g., an ASIC for processing sensor data and/or communicating the sensor data). In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in the vehicle computer 110.

The vehicle computer 110 may include programming to operate one or more of vehicle 105 propulsion, steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to (e.g., via a vehicle communications network such as a communications bus as described further below) more than one processor (e.g., included in electronic controller units (ECUs) or the like included in the vehicle 105) for monitoring and/or controlling various vehicle components 125 (e.g., a transmission controller, a steering controller, etc.). The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices (e.g., sensors 115, an actuator 120, ECUs, etc.). Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115 (e.g. front view, side view, etc.) providing images from an area surrounding the vehicle 105. In the context of this disclosure, an object is a physical (i.e., material) item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form (e.g., geo-coordinates such as latitude and longitude coordinates obtained via a navigation system, as is known, that uses the Global Positioning System (GPS)). Additionally, or alternatively, the data can include a location of an object (e.g., a vehicle, a sign, a tree, etc.) relative to the vehicle 105. As one example, the vehicle computer 110 can actuate a lidar sensor 115 to obtain lidar data of the environment around the vehicle 105. The sensors 115 can be mounted to any suitable location in or on the vehicle 105 (e.g., on a vehicle 105 bumper, on a top of a vehicle 105, etc.) to collect data of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including propulsion and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a park assist component, an adaptive cruise control component, an adaptive steering component, etc.

In addition, the vehicle computer 110 may be configured for communicating via a vehicle-to-vehicle communication module 130 or interface with devices outside of the vehicle 105 (e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications)). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 130 according to any suitable short-range communications mechanism (e.g., DSRC, cellular, or the like).

The network 135 represents one or more mechanisms by which a vehicle computer 110 may communicate with remote computing devices (e.g., the remote server computer 140, another vehicle computer, etc.). Accordingly, the network 135 can be one or more of various wired or wireless communication mechanisms, including any desired combination of wired (e.g., cable and fiber) and/or wireless (e.g., cellular, wireless, satellite, microwave, and radio frequency)

communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device (i.e., including one or more processors and one or more memories) programmed to provide operations such as disclosed herein. Further, the remote server computer 140 can be accessed via the network 135 (e.g., the Internet, a cellular network, and/or or some other wide area network).

The vehicle control system 100 can include one or more remote computing nodes 145, where a remote computing node 145 is one or more computing devices that receives sensor 115 data from and communicates with one or more objects, including vehicles 105 and/or with the remote server computer 140 (e.g., via the network 135).

FIG. 2 is a diagram of an example object identification system 200 that identifies, from lidar data acquired by the vehicle 105, respective types of objects (e.g., a sedan, a truck, a motorcycle, a bicycle, etc.) in an environment around the vehicle 105. The object identification system 200 can further provide respective trajectories for the respective moveable objects. A "trajectory" specifies an expected path for a moveable object.

The object identification system 200 can be implemented as programming to execute on the vehicle computer 110. The vehicle computer 110 can use the object identification system 200 to operate the vehicle 105. For example, the vehicle computer 110 can determine a path for operating the vehicle 105 around the stationary objects while accounting for moveable objects, as discussed below.

The vehicle computer 110 can receive data of an environment around the vehicle 105. For example, the vehicle computer 110 can receive lidar data of the environment. The lidar data can include one or more objects in the environment. The objects may be any suitable type of object (e.g., a bicycle, a tree, a building, a utility pole, a sedan, a sport utility vehicle, a cargo van, a truck, etc.).

The vehicle computer 110 can, for example, receive lidar data from a lidar sensor 115. The lidar sensor 115 may include a scanning lidar emitter and receiver, which can operate by detecting distances to objects by emitting laser pulses at a particular wavelength and measuring the time of flight for the pulse to travel to an object in the environment of the vehicle 105 and back to the lidar sensor 115. The lidar sensor 115 can also include an emitter that transmits a continuous beam and measures the phase shift in a received signal. Thus, the lidar sensor 115 can include any suitable type of scanning lidar signal emitter and receiver, which may cooperate to provide lidar sensor measurements to the vehicle computer 110. The lidar data can include a plurality of parameters, i.e., measurable values of a physical phenomena, such as azimuth, range, doppler, lidar cross-section (LCS), etc.

The lidar data may form a point cloud (PC) 202 represented as a plurality of dots. A "point cloud" is a set of data in a 3D coordinate system, e.g., a Cartesian coordinate system with a lateral axis X, a longitudinal axis Y, and a vertical axis Z. That is, the lidar sensor 115 can collect data as a set of 3D data points, the 3D data points forming a volume in the coordinate system. The volume defined by the set of 3D data points is the point cloud 202. The point cloud 202 may be specified according to a sensor coordinate system (i.e., a Cartesian coordinate system having an origin at a specified point on the lidar sensor). The vehicle computer 110 may be programmed to transform (e.g., according to known coordinate system transformation techniques) the point cloud 202 from the sensor coordinate system to a vehicle coordinate system (i.e., a Cartesian coordinate system having an origin at a specified point on the vehicle 105).

The object identification system 200 can generate a time series (TS) 212 of respective point clouds 202. As used herein, a "time series" is a set of data issued sequentially over time. The respective point clouds 202 can be generated based on respective lidar data acquired during respective measurement scans (i.e., emitting and receiving pulses) occurring sequentially over time. The lidar sensor 115 runs at a scanning rate, which is an occurrence interval of a measurement scan (e.g., twice per second, once every two seconds, etc.) Thus, over time, the object identification system 200 can determine respective trajectories of respective objects over a time series 212 of respective point clouds 202. A time series may extend over any suitable duration, such as five seconds, 10 seconds, 15 seconds, etc.

The time series 212 of the respective point clouds 202 is passed to a deep neural network (DNN) 214. The DNN 214 can be a software program executing on the vehicle computer 110. In this example, the DNN 214 is illustrated as a convolutional neural network (CNN). Techniques described herein can also apply to DNNs that are not implemented as CNNs. A DNN 214 implemented as a CNN typically inputs the time series 212 of the respective point clouds 202 as input data. The time series 212 of the respective point clouds 202 are processed by convolutional layers 216 to form latent variables 218 (i.e., variables passed between neurons in the DNN 214). Convolutional layers 216 include a plurality of layers that each convolve the time series 212 of the respective point clouds 210 with convolution kernels that transform the time series 212 of the respective point clouds 202 and process the transformed time series 212 of the respective point clouds 202 using algorithms such as max pooling to reduce the resolution of the transformed time series 212 of the respective point clouds 202 as they are processed by the convolutional layers 216. The latent variables 218 output by the convolutional layers 216 are passed to fully connected layers 220. Fully connected layers 220 include processing nodes. Fully connected layers 220 process latent variables 218 using linear and non-linear functions to output a prediction. In examples discussed herein, the output prediction identifies respective objects 222. The output prediction may further include respective object 222 trajectories. Additionally, the time series 212 of the respective point clouds 202 may be provided to the remote computing node 145 (e.g., via the network 135).

The vehicle computer 110 can operate the vehicle 105 to account for the respective objects 222 identified by the DNN 214. For example, the vehicle computer 110 can generate a path along which to operate the vehicle 105 that accounts for the respective object 222 trajectories (e.g., to maintain a specified distance between the vehicle 105 and the respective objects 222 as the vehicle 105 operates along the path). The vehicle computer 110 can then actuate one or more vehicle components 125 to operate the vehicle 105 along the path.

A path can be specified according to one or more path polynomials. A path polynomial is a polynomial function of degree three or more that describes the motion of a vehicle on a ground surface. Motion of a vehicle on a roadway is described by a multi-dimensional state vector that can include vehicle location, heading angle, yaw, speed, etc. that can be determined by fitting a polynomial function to successive 2D locations included in the vehicle motion vector with respect to the ground surface, for example.

Further for example, the path polynomial is a model that predicts the path as a line traced by a polynomial equation. The path polynomial predicts the path for a predetermined upcoming distance, by determining a lateral coordinate, e.g., measured in meters:

$$p(x) = a_0 + a_1x + a_2x^2 + a_3x^3 \tag{1}$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

FIG. 3 is a diagram of a DNN training system 300 for training a DNN 318 to identify respective objects 320 and respective object trajectories 322 in a time series of respective point clouds. The DNN training system 300 can include a software program executing on the remote computing node 145 included in the vehicle control system 100.

The DNN training system 300 can transform (TR) 302 a training dataset. The training dataset includes point clouds and corresponding ground truth data. Training datasets for a DNN 214 can include thousands or millions of point clouds and corresponding annotations or ground truth data. The point clouds may include existing objects (i.e., objects represented by respective pluralities of dots included in the point clouds) and corresponding ground truth data (e.g., a type of object, a 3D bounding box (as described further below), an object trajectory, etc.) for the existing objects. The training dataset may be stored (e.g., in a memory of the remote computing node 145). The point clouds in the training dataset may be specified with respect to a sensor coordinate system, i.e., a coordinate system defined with respect to a sensor. The DNN training system 300 can, for example, transform (e.g., using known coordinate transformation techniques) the respective point clouds included in the training dataset from the sensor coordinate system to a coordinate system defined with respect to a vehicle, i.e., a vehicle coordinate system (e.g., in a same manner as discussed above with regards to the vehicle computer 110). That is, the DNN training system 300 can transform respective coordinates of dots included in the respective point clouds from the sensor coordinate system to the vehicle coordinate system. The transformed training dataset may be stored (e.g., in a memory of the remote computing node 145).

The DNN training system 300 may generate a temporal training dataset (TTD) 304 from the transformed training dataset 302 by arranging the point clouds included in the transformed training dataset 302 based on an order in which the point clouds were acquired within a duration of a time series. Generating the temporal training dataset 304 allows for determining ground truth trajectories for objects. For example, respective object states (e.g., included as ground truth data in the respective point clouds) can be concatenated with each other over the duration of a time series to generate respective ground truth trajectories for the respective objects included in the time series of point clouds. That is, the temporal training dataset 304 includes respective time series of respective point clouds and corresponding ground truth data, including respective trajectory ground truth data. The temporal training dataset 304 may be stored (e.g., in a memory of the remote computing node 145). As used herein, an "object state" is a parameter of an object (e.g., a speed, a heading angle, a lateral offset, a yaw rate, a position, etc.).

The DNN training system 300 selects a time series of point clouds (PC) 306 from the temporal training dataset 304. The DNN training system 300 can identify existing objects included in the time series of point clouds 306 (e.g., based on ground truth data included in the point clouds 306). The respective point clouds 310 can include three-dimensional 3D bounding boxes for the existing objects. A "bounding box" is a closed boundary defining a set of point cloud data. For example, the point cloud data within a bounding box can represent a same object, e.g., a bounding box can define point cloud data representing an object. A 3D bounding box is typically defined as a smallest rectangular prism that includes all of the point cloud data of the corresponding object. The 3D bounding box is described by contextual information including a center and eight corners, which are expressed as x, y, and z coordinates in the vehicle coordinate system.

The DNN training system 300 is programmed to generate a time series of synthetic point clouds (SYN) 310. To generate the time series of synthetic point clouds 310, the DNN training system 300 inserts respective objects a respective number of times (e.g., two (2) motorcycles, one (1) sedan, etc.) into the time series of point cloud images 306. The DNN training system 300 can determine the respective numbers of times of the respective objects based on object sampling. Object sampling 308 includes determining numbers of times of respective data (e.g., respective objects) based on a distribution of the respective data (i.e., a relative number of instances that the respective data is included) in a dataset (e.g., the temporal training dataset 304). For example, the respective numbers of times of the respective objects can be inversely proportional to the distribution of the respective objects in the temporal training dataset 304. Other non-limiting examples for determining the respective numbers of times of the respective objects include a number of point cloud datums associated with the respective object and an ease with which respective objects is detected during vehicle operation (e.g., determined based on a number of instances that the respective objects being detected in vehicle sensor 115 data).

Upon determining the respective numbers of times of the respective objects, the DNN training system 300 can select the respective objects from the temporal training dataset 304. That is, the DNN training system 300 can select the respective point clouds and the corresponding annotations associated with the respective objects. In this situation, the respective point clouds may include ranges within a range threshold (as described further below). The DNN training system 300 then generates respective synthetic objects by inserting the respective selected objects the respective numbers of times (e.g., two (2) motorcycles, one (1) sedan, etc.) into the time series of point clouds 306. The DNN training system 300 can utilize known data augmentation techniques, such as "cut and paste," to generate the synthetic point clouds 310 by removing the respective point cloud data associated with respective selected objects from the temporal training dataset 304 and by inserting the respective removed point cloud data the respective number of times into the time series of point clouds 306. Generating the synthetic point clouds 310 using the respective point cloud data and the corresponding annotations associated with respective selected objects from the temporal training dataset 304 allows the DNN training system 300 to include annotations corresponding to the synthetic objects in the synthetic point clouds 310.

The DNN training system 300 translates the respective synthetic objects in the time series of point clouds 306 based on the range threshold. That is, the DNN training system 300 increases respective ranges to respective synthetic objects inserted to the point clouds 306 so as to be at or beyond the range threshold. That is, coordinates for each point associated with the respective synthetic objects are updated such that the respective ranges of the corresponding synthetic points are at or beyond the range threshold. The DNN training system 300 can utilize known translation techniques (e.g., according to logarithmic functions) to determine updated coordinates for each point associated with the respective synthetic objects based on the range threshold. Upon translating the respective synthetic objects, the DNN training system 300 updates the respective annotations corresponding to the respective synthetic objects to include the updated respective ranges (e.g., based on the updated coordinates). The DNN training system 300 maintains the point cloud data associated with existing objects in the points 306. That is, the respective ranges for existing objects is the same in the synthetic point clouds 310 and the point clouds 306.

The range threshold may, for example, be a specified distance from a vehicle. The range threshold may be stored (e.g., in a memory of the remote computing node 145). The range threshold(s) may be determined empirically (e.g., based on testing and/or simulation to determine a maximum distance between a vehicle and an object at which the vehicle begins accounting for the object (e.g., based on speed, heading, etc.) when operating the vehicle along various paths).

After generating the time series of synthetic point clouds 310, the DNN training system 300 can process (PR) 311 the synthetic point clouds 310 to enhance realism of the synthetic point clouds 310. For example, the DNN training system 300 can adjust a point cloud density (PCD) 312 of the synthetic objects (i.e., the translated inserted objects). A point cloud density is a number of points for a given range at which an object is sampled. That is, the farther an object is from a source (e.g., a lidar sensor), the lower the point cloud density for the object. The DNN training system 300 can identify respective existing objects in the synthetic point clouds 310 that are at a same range (e.g., based on the annotations) as the respective synthetic objects. The DNN training system 300 can then adjust (e.g., according to known beam adding/dropping techniques) a point cloud density of the respective synthetic objects based on a point cloud density of an existing object at the same range. That is, the DNN training system 300 can, for example, remove respective synthetic points associated with the respective synthetic objects such that the respective point cloud densities of the respective synthetic objects match the point cloud density of the existing object at the same range. Adjusting the point cloud density of the synthetic objects enhances the realism of the synthetic point clouds by representing objects at similar ranges with similar point cloud densities.

The DNN training system can determine respective trajectories (TC) 314 for the respective synthetic objects in the time series of synthetic point clouds 310. For example, the respective 3D bounding boxes (e.g., included as ground truth data in the respective point clouds) of the respective synthetic objects can be concatenated with each other over the duration of a time series to generate respective trajectories for the respective synthetic objects included in the time series of synthetic point clouds 310. That is, the respective trajectories can be determined based on respective changes in respective locations of the respective 3D bounding boxes over time.

The DNN training system 300 can then determine whether to remove (RE) 316 synthetic point cloud data for a synthetic object from a respective synthetic point cloud 310 based on the trajectory of the synthetic object. The DNN training system 300 can compare the trajectory of the synthetic object to the respective trajectories of the respective existing objects (e.g., included as ground truth data in the respective point clouds) in the respective synthetic point cloud 310. If the trajectory of the synthetic object intersects at least one trajectory of the corresponding existing object in one synthetic point cloud 310, then the DNN training system 300 can remove the synthetic point cloud data for the synthetic object from the one synthetic point cloud 310. Additionally, the DNN training system 300 can remove the synthetic point cloud data for the synthetic object from the respective synthetic point cloud 310 that are after the one synthetic point cloud 310 in the time series. If the trajectory of the synthetic object does not intersect at least one trajectory of a corresponding existing object in one synthetic point cloud 310, then the DNN training system 300 can maintain the synthetic point cloud data for the synthetic object in the one synthetic point cloud 310. Selectively removing the synthetic point cloud data associated with synthetic objects can enhance the realism of the synthetic point clouds by maintaining consistent data representation for objects over time. The DNN training system 300 can determine whether to remove the synthetic point cloud data for each of the respective synthetic objects in each of the respective synthetic point clouds 310 in this manner.

After processing the synthetic point clouds 310, the DNN training system 300 trains the DNN 318 by using the time series of synthetic point clouds 310. Each time series of synthetic point clouds 310 can be processed a plurality of times by the DNN 318. A prediction output from the DNN 318 in response to an input time series of synthetic point clouds 310 identifies respective types of objects (OBJ) 320 in the time series of synthetic point clouds 310. The prediction output from the DNN 318 further includes respective object trajectories (TJ) 322 in the time series of synthetic point clouds 310. The prediction output 320, 322 is compared to (e.g., ground truth annotations of) the time series of synthetic point clouds 310 to determine a loss function (LOSS) 324. The loss function is a mathematical function that determines how closely the prediction 320, 322 output from the DNN 318 matches the ground truth data (e.g., object types, object locations, and object trajectories) of the time series of synthetic point clouds 310. The value determined by the loss function is input to the convolutional layers and fully connected layers of the DNN 318 where it is backpropagated to determine weights for the layers that correspond to a minimum loss function. Backpropagation is a technique for training a DNN 318 where a loss function is input to the convolutional layers and fully connected layers furthest from the input and communicated from back-to-front and determining weights for each layer by selecting weights that minimize the loss function. Once trained, the DNN 318 can identify, via point cloud data associated with an object, the object and an object trajectory.

The remote computing node 145 can provide the trained DNN 318 to the vehicle computer 110 (e.g., via the network 135). Additionally, the remote computing node 145 can receive a time series 212 of point clouds 210 from the vehicle computer 110, as discussed above. The DNN training system 300 can, for example, re-train the DNN 318 based on the received time series 212 of point clouds 210. In such an example, the DNN training system 300 can replace selection of the time series of point clouds 306 from the temporal training dataset 304 with the received time series 212 of point clouds 210 and process the point clouds 210 to re-train the DNN 318, as discussed above. Re-training the DNN 318 with a time series 212 of point clouds 210 received from the vehicle computer 110 can incrementally enhance the DNN 318 over time.

Figure 4:
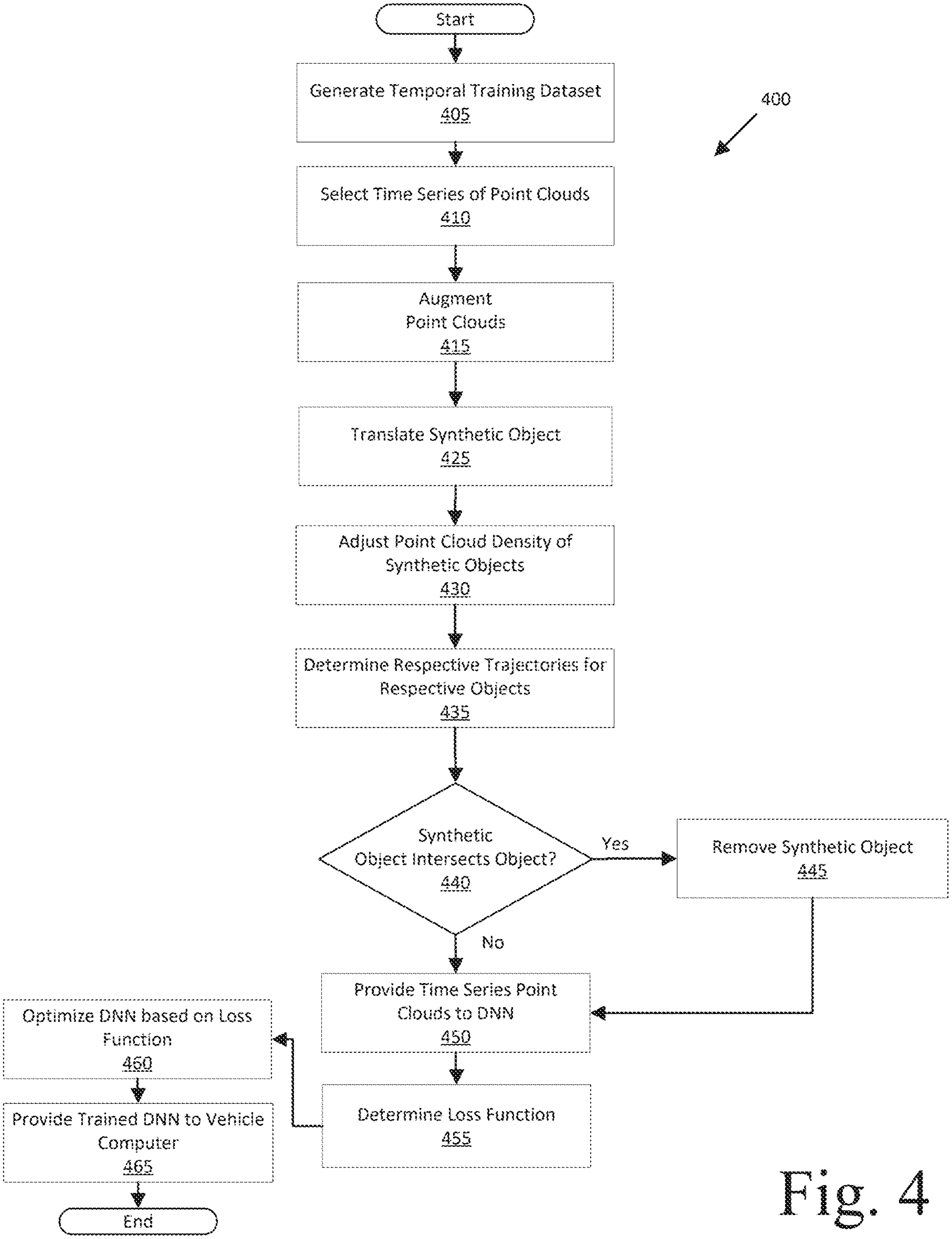
FIG. 4 is an example flowchart of an example process for training a DNN.

FIG. 4 is a diagram of an example process 400 for training a DNN 318. The process 400 begins in a block 405. The process 400 can be carried out by a remote computing node 145 executing program instructions stored in a memory thereof.

In the block 405, the remote computing node 145 generates a temporal training dataset 304. The remote computing node 145 can, for example, transform respective point clouds included in a training dataset from a sensor coordinate system to a vehicle coordinate system, as discussed above. The point clouds included in the training dataset can include ground truth data, as discussed above. The remote computing node 145 can further arrange the point clouds in a time series based on an order in which the point clouds were acquired within a duration of a time series, as discussed above. Based on the ground truth data and the sequential order of the point clouds in the time series, the remote computing node 145 can determine respective trajectories for respective existing objects included in the point clouds, as discussed above. The remote computing node 145 can annotate the point clouds with the respective trajectories, as discussed above. The process 400 continues in a block 410.

In the block 410, the remote computing node 145 selects a time series of point clouds 306 from the temporal training dataset 304. The remote computing node 145 can identify existing objects included in the time series of point clouds 306, as discussed above. The process 400 continues in a block 415.

In the block 415, the remote computing node 145 augments the point clouds 306 to include respective objects a respective number of times, as discussed above. The remote computing node 145 can, for example, perform object sampling to determine the respective numbers of times of respective objects, as discussed above. The remote computing node 145 can then select respective objects from the temporal training dataset 304, as discussed above. The remote computing node 145 can then generate the synthetic objects by inserting the respective selected objects into the point clouds 306 the respective numbers of times, as discussed above. The process 400 continues in a block 425.

In the block 425, the remote computing node 145 translates the synthetic objects included in the time series of point clouds 306 based on a range threshold, as discussed above. That is, the remote computing node 145 increases respective ranges to respective synthetic objects included in the point clouds 306 so as to be at or beyond the range threshold, as discussed above. The process 400 continues in a block 430.

In the block 430, the remote computing node 145 adjusts a point cloud density of the synthetic objects. For example, the remote computing node 145 can identify respective existing objects in the synthetic point clouds 310 that are at a same range (e.g., based on the annotations) as the respective synthetic objects, as discussed above. The remote computing node 145 can then adjust (e.g., according to known beam adding/dropping techniques) the point cloud density of the respective synthetic objects based on a point cloud density of an existing object at the same range, as discussed above. The process 400 continues in a block 435.

In the block 435, the remote computing node 145 determines respective trajectories of the respective synthetic objects included in the time series of synthetic point clouds 310. For example, the remote computing node 145 can concatenate respective 3D bounding boxes (e.g., included in the ground truth data) of the respective synthetic objects with each other over the duration of a time series to generate respective trajectories, as discussed above. The process 400 continues in a block 440.

In the block 440, the remote computing node 145 determines whether a trajectory of a synthetic object intersects a trajectory of an existing object (e.g., included in ground truth data) in the time series of synthetic point clouds 310. If the trajectory of one synthetic object intersects the trajectory of at least one existing object in one synthetic point cloud 310, then the process 400 continues in a block 445. If the respective trajectories of the respective synthetic objects do not intersect the respective trajectories of the respective existing objects in the synthetic point clouds 310, then the process 400 continues in a block 450.

In the block 445, the remote computing node 145 removes the point cloud data associated with the one synthetic object from the one synthetic point cloud 310. Additionally, as discussed above, the remote computing node 145 can remove the point cloud data associated with the one synthetic object from the synthetic point clouds 310 in the time series that occur after the one synthetic point cloud 310. The process 400 continues in the block 450.

In the block 450, the remote computing node 145 inputs the time series of synthetic point clouds 310 into a DNN 318. An output from the DNN 318 identifies objects in the time series of synthetic point clouds 310 and respective trajectories for the identified objects, as discussed above. The process 400 continues in a block 455.

In the block 455, the remote computing node 145 determines a loss function. For example, the remote computing node 145 can compare the output from the DNN 318 to the time series of synthetic point clouds 310, as discussed above. The process 400 continues in a block 460.

In the block 460, the remote computing node 145 trains the DNN 318 based on the loss function. The loss function can be backpropagated through the DNN 318 layers to determine weights that yield a minimum loss function based on processing the input time series of synthetic point clouds 310 a plurality of times and determining a loss function for each processing iteration. Because the steps used to determine the loss function are differentiable, the partial derivatives determined with respect to the weights can indicate in which direction to change the weights for a succeeding processing iteration that will reduce the loss function and thereby permit the training function to converge, thereby optimizing the DNN 318. The process 400 continues in a block 465.

In the block 465, the remote computing node 145 provides the trained DNN 318 to the vehicle computer 110 (e.g., via the network 135). The process 400 may end following the block 465. Alternatively, the remote computing node 145 can receive a time series 212 of point clouds 210 from the vehicle computer 110 (e.g., via the network 135), as discussed above. In such an example, the process 400 can return to the block 415 to re-train the DNN 318, which can incrementally enhance the DNN 318 over time.

Figure 5:
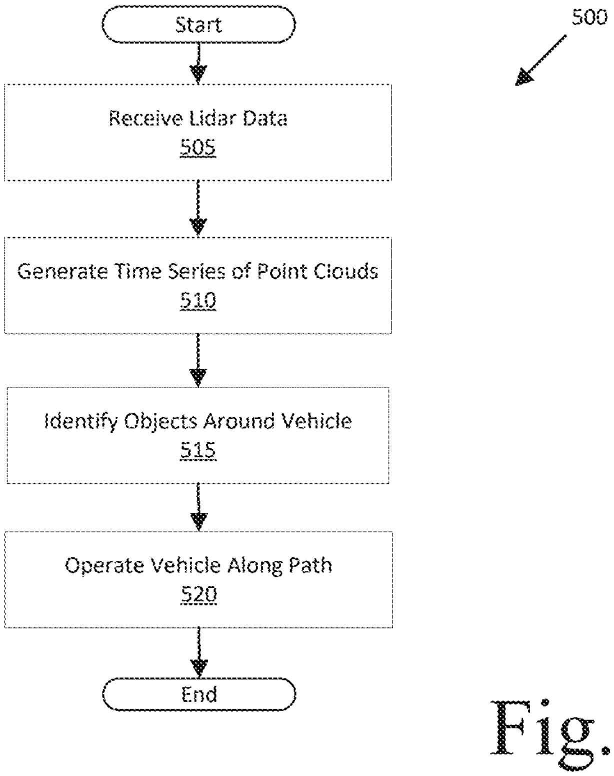
FIG. 5 is an example flowchart of an example process for operating a vehicle with a trained DNN.

FIG. 5 is a diagram of an example process 500 for operating a vehicle. The process 500 begins in a block 505. The process 500 can be carried out by a vehicle computer 110 included in the vehicle 105 executing program instructions stored in a memory thereof.

In the block 505, the vehicle computer 110 obtains a time series 212 of point clouds 210. The vehicle computer 110 can, for example, receive, from a lidar sensor 115, lidar data of the environment, including one or more objects therein, around the vehicle 105, as discussed above. The process 500 continues in a block 510.

In the block 510, the vehicle computer 110 generates a time series 212 of point clouds 210 based on the lidar data. The point clouds 210 acquired during the duration of the time series 212 are arranged sequentially (e.g., based on an order that the respective lidar data was acquired) to generate the time series 212 of point clouds 210. The process 500 continues in a block 515.

In the block 515, the vehicle computer 110 identifies respective objects around the vehicle 105 based on the time series 212 of point clouds 210. Additionally, the vehicle determines respective trajectories for the respective objects based on the time series 212 of point clouds 210. Specifically, the vehicle computer 110 inputs the time series 212 of point clouds 210 into a DNN 214 trained to identify objects in the environment around the vehicle and object trajectories, as discussed above. The process 500 continues in a block 520.

In the block 520, the vehicle computer 110 operates the vehicle 105 based on the respective identified objects and the respective trajectories for the respective objects. For example, the vehicle computer 110 can generate a path (e.g., according to known path planning techniques) that navigates the vehicle 105 through the environment while accounting for the respective identified objects given the respective trajectories of the respective objects, as discussed above. The vehicle computer 110 can then actuate one or more vehicle components 125 to move the vehicle 105 along the path, as discussed above. The process 500 ends following the block 520. Alternatively, the process 500 can return to the block 505 (e.g., while the vehicle remains in an ON state).

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer-implemented method, comprising:

after generating a time series of lidar point clouds, inserting point cloud data associated with an object in respective lidar point clouds in the time series of LIDAR sensor point clouds;

translating, in the respective point clouds, the point cloud data by updating spatial coordinates of the point cloud data associated with the object so as to increase a distance between the object and a source of the point clouds so that the object is positioned at or beyond a range threshold; and based on the translated point cloud data, training a machine learning computer program to identify the object at or beyond the range threshold.

2. The method of claim 1, further comprising, for the respective point clouds:

identifying a second object at the range threshold based on point cloud data associated with the second object; and upon translating the point cloud data associated with the object, adjusting a density of the point cloud data associated with the object based on a density of the point cloud data associated with the second object.

3. The method of claim 1, further comprising:

upon obtaining point cloud data via a sensor, inputting the point cloud data into the trained machine learning program; and operating a vehicle based on output from the trained machine learning program.

4. The method of claim 1, further comprising determining a trajectory of the object based on concatenating three-dimensional (3D) bounding boxes associated with the translated point cloud data in the respective point clouds with one another.

5. The method of claim 4, further comprising, upon determining that the trajectory of the object intersects a trajectory of a second object included in one of the point clouds, removing the point cloud data associated with the object from the one point cloud.

6. The method of claim 5, further comprising removing the point cloud data associated with the object from each of the respective point clouds that are after the one point cloud in the time series.

7. The method of claim 4, further comprising, based on inputting the trajectory to the machine learning program, training the machine learning program to predict the trajectory of the object.

8. The method of claim 1, wherein the point cloud data associated with the object is ground truth data.

9. The method of claim 8, further comprising, upon translating the point cloud data, updating annotations corresponding to the point cloud data based on the updated spatial coordinates.

10. The method of claim 1, further comprising determining a number of times to insert the point cloud data associated with the object based on a distribution of the object in a training dataset.

11. A system, comprising a computer including a processor and a memory, the memory storing instructions executable by the processor to:

after generating a time series of point clouds, insert point cloud data associated with an object in the respective point clouds;

translate, in the respective point clouds, the point cloud data by updating spatial coordinates of the point cloud data associated with the object so as to increase a distance between the object and a source of the point clouds so that the object is positioned at or beyond a range threshold; and based on inputting the translated point cloud data to a machine learning program, identify the object at or beyond the range threshold via output from the machine learning program.

12. The system of claim 11, wherein the instructions further include instructions to, for the respective point clouds:

identify a second object at the range threshold based on point cloud data associated with the second object; and upon translating the point cloud data associated with the object, adjust a density of the point cloud data associated with the object based on a density of the point cloud data associated with the second object.

13. The system of claim 11, further comprising a vehicle computer, including a second processor and a second memory storing instructions executable by the second processor such that the vehicle computer is programmed to:

upon obtaining point cloud data via a sensor, input the point cloud data into the trained machine learning program; and operate a vehicle based on output from the trained machine learning program.

14. The system of claim 11, wherein the instructions further include instructions to determine a trajectory of the object based on concatenating a three-dimensional (3D) bounding box associated with the translated point cloud data in the respective point clouds with one another.

15. The system of claim 14, wherein the instructions further include instructions to upon determining that the trajectory of the object intersects a trajectory of a second object included in one of the point clouds, remove the point cloud data associated with the object from the one point cloud.

16. The system of claim 15, wherein the instructions further include instructions to remove the point cloud data associated with the object from each of the respective point clouds that are after the one point cloud in the time series.

17. The system of claim 14, wherein the instructions further include instructions to, based on inputting the translated point cloud data to the machine learning program, predict the trajectory of the object via output from the machine learning program.

18. The system of claim 11, wherein the point cloud data associated with the object is ground truth data.

19. The system of claim 18, wherein the instructions further include instructions to, upon translating the point cloud data, updating annotations corresponding to the point cloud data based on the updated spatial coordinates.

20. The system of claim 11, wherein the instructions further include instructions to determine a number of times to insert the point cloud data associated with the object based on a distribution of the object in a training dataset.

* * * * *